E. W. DUNN.
ORCHARD HEATER.
APPLICATION FILED JULY 30, 1913.
1,125,014.
Patented Jan. 12, 1915.
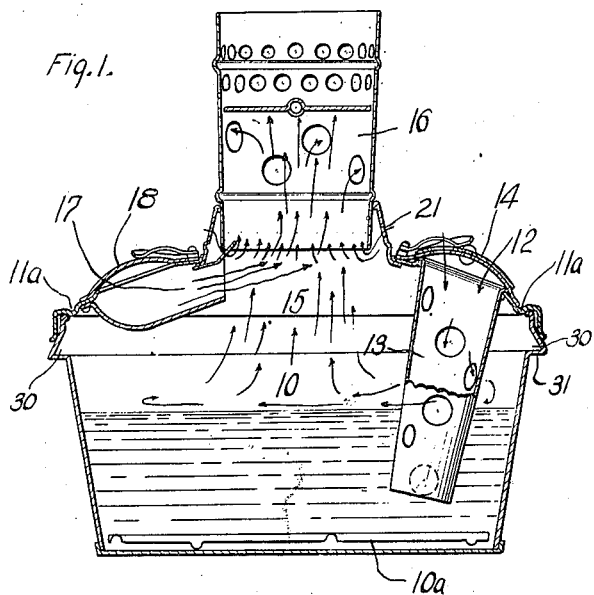
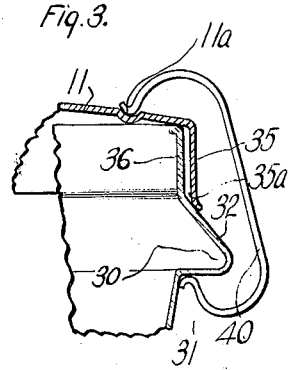
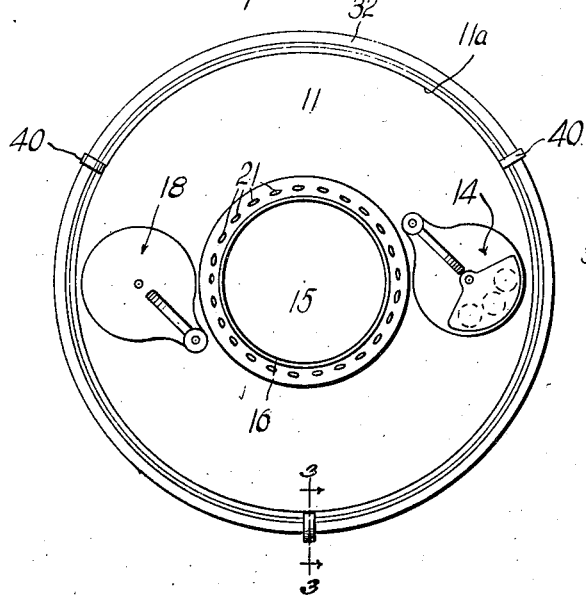
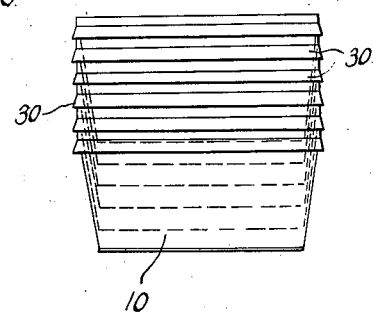
Witnesses
Elwood H. Barkelew
L. Hoffman
Inventor
Emanuel W. Dunn.
by James T. Barkelew
his Attorney.

UNITED STATES PATENT OFFICE.

EMANUEL W. DUNN, OF SAN FRANCISCO, CALIFORNIA.

ORCHARD-HEATER.

1,125,014.  Specification of Letters Patent.  Patented Jan. 12, 1915.

Application filed July 30, 1913. Serial No. 782,040.

*To all whom it may concern:*

Be it known that I, EMANUEL W. DUNN, a citizen of the United States, residing at San Francisco, in the county of San Francisco, State of California, have invented new and useful Improvements in Orchard-Heaters, of which the following is a specification.

This invention relates to improvement in orchard heaters of the general class described and set forth in my United States Letters Patent, No. 1,063,422 of June 3rd, 1913; and the particular features of this invention consists in certain mechanical formations of the liquid fuel pot, and of the cover therefor, and of means for holding said cover on the pot, as will be hereinafter described.

It is particularly the object of this invention to provide a means and a combination of various means to perform several different functions; among which are the following: to provide a pot of ample strength; to provide a suitable handle for the pot by means of which it may be picked up and carried; to provide means for suitably nesting the pots together for transportation; to provide means for making the cover tight on the pot without allowing it to become set or stuck thereon, so that, although the joint between the pot and cover is at all times tight, the cover may be easily removed from the pot when desired; and to provide means to attach the cover tightly upon the pot while the heater is in operation.

I have shown my preferred form of heater embodying the present particular invention in the accompanying drawings, in which:

Figure 1 is a vertical section of my heater showing my improved construction. Fig. 2 is a plan view thereof. Fig. 3 is a detail section taken as indicated by line 3—3 of Fig. 2. Fig. 4 is a view showing how the pots may be nested for transportation.

In my preferred form of heater I employ a suitable pot 10, which, according to my present invention is preferably inverted frusto-conical in shape, surmounted by a cover 11 which has therein an air inlet 12 with tube 13 and control cover 14 to admit the air to the fuel contained in the pot. A combustion outlet 15 is preferably central of the cover, and is surmounted by a combustion stack 16 of any preferred design and construction. I may employ suitable auxiliary air inlets 17 and 21, inlet 17 being controlled by cover 18; but these features do not enter into the particular points of my present invention. They may be varied to suit circumstances. I may also use a false bottom 10ª for the pot.

According to my invention particularly herein described, I provide the pot 10 with an annular offset 30 near its upper end, which offset is so formed as to present a downwardly facing shoulder 31 below and an upwardly facing preferably conical surface 32 above. I have shown the shoulder 31 as being approximately horizontal; but this is not absolutely necessary, as will hereinafter appear.

There are three distinct functions and advantages of the offset 30. First, the downwardly facing shoulder 31 acts as a shoulder which may rest upon the upper edge of a pot directly underneath, when the pots are nested, as shown in Fig. 4, for purposes of transporation. Secondly, the shoulder 31 acts as a handle by which the pot may be grasped when being moved by hand. And, thirdly, the offset 30 acts as a reinforcement for the upper edge of the pot, the material being placed in such position as to form a very effective reinforcement against deformation of the upper part of the pot from its proper circular shape.

Another particular feature of my present invention is the combination of the cover 11 with the offset 30 on the pot. I preferably form the cover 11 with a downwardly turned cylindrical flange 35 which fits over the cylindrical edge 36 of the pot, which cylindrical edge is directly above the conical surface 32. The flange 35 is made of such diameter that it easily fits over the upper edge of the pot and cannot become bound, set or stuck thereon, so as to make the cover very easily removable from the pot when desired. But the flange 35 is of proper depth so that its lower edge 35ª fits down upon the conical surface 32 and an air tight joint is thus formed between the pot and cover. With the parts properly constructed the weight of the cover and parts carried thereby is sufficient to force the flange 35 into air tight engagement with the conical surface 32. But for this purpose of security, and to prevent the cover from being accidentally removed from the pot, I prefer to provide means for holding the cover on the pot; and this means includes the downwardly facing shoulder 31, which is thereby given another function as described. The cover 11 is preferably formed with a circular groove 11ª around its edge into which suitable clamps 40 engage. These clamps are preferably in the form of simple spring clips which are sprung into the groove and sprung under the shoulder 31, as is best shown in detail in Fig. 3. I have found that a comparatively light spring clip will perform the office of holding the cover on the pot and will prevent its removal except when desired. But the cover may be very easily removed by simply releasing the spring clips and lifting upwardly on the cover. There is no opportunity for the cover to bind upon the pot, as the flange 35 fits easily over the flange 36, and the only tight connection is where the lower edge of the flange 35 bears upon the conical surface 32. The offset 30 prevents deformation of the upper edge of the pot from its proper circular form, while the flat or slightly conical shape of the cover prevents deformation of the flange 35 from its circular form. Consequently the parts are always in condition to fit easily and accurately with each other and to form a tight joint between the pot and the cover. The groove or bead 11ª also performs the function of stiffening and reinforcing the cover and holding it to proper circular shape and prevent warping. (I say circular for the reason that I prefer to make my heater circular in form; but it is understood that the heater may be of any other form). The bead also, with the outer flange of the cover, forms a groove into which the upper edge of the pot is adapted to fit, making good and tight connection between the pot and cover.

It is understood that I may vary the details of my construction above set forth; and that the specific character of heater, to which my present invention may be applied, may be varied. I prefer to use a heater of the general character set forth, having great advantages of efficiency of operation, etc.

Having described a preferred form of my invention, I claim:

1. In a heater, a liquid fuel pot having a continuous outwardly extending offset near its upper end forming a downwardly facing shoulder and an upwardly facing conical surface directly below the upper edge of the pot, and a cover for the pot having a flanged edge adapted to loosely fit over the upper edge of the pot, the lower edge of said flange engaging said conical surface.

2. In a heater, a liquid fuel pot having a continuous outwardly extending offset near its upper end forming a downwardly facing shoulder and an upwardly facing conical surface directly below the upper edge of the pot, a cover for the pot having a flanged edge adapted to loosely fit over the upper edge of the pot, the lower edge of said flange engaging said conical surface, and clamping means engaging over the cover and under said downwardly facing shoulder to hold the cover on the pot.

3. In a heater, a liquid fuel pot having a continuous outwardly extending offset near its upper end forming a downwardly facing shoulder and an upwardly facing conical surface directly below the upper edge of the pot, a cover for the pot having a flanged edge adapted to loosely fit over the upper edge of the pot, the lower edge of said flange engaging said conical surface, the cover also having a groove near its flanged periphery, and spring clips engaging in said groove and under said shoulder to hold the cover on the pot.

4. A heater comprising a liquid fuel pot having a continuous outwardly extending offset near its upper end forming a downwardly facing shoulder and an uwardly facing conical surface directly below the upper edge of the pot, a cover for the pot having a central combustion opening and having a flanged edge adapted to loosely fit over the upper edge of the pot, the lower edge of said flange engaging said conical surface to form a tight joint between the pot and cover, air induction means leading through the cover, and a combustion flue extending upwardly from said opening in the cover.

5. A heater, comprising an inverted frusto-conical liquid fuel pot having a continuous annular offset near its upper edge forming a downwardly facing shoulder and an upwardly facing conical surface directly below the upper edge of the pot, the exterior diameter of the pot at said shoulder being less than the internal diameter at the upper end of the pot so that when a plurality of said pots are nested the shoulder of one will rest on the upper edge of the one adjacent below and thus support the upper one in the lower one, a conical cover for the pot having a central combustion opening and having a flanged edge adapted to loosely fit over the upper edge of the pot, the lower edge of said flange engaging said conical surface to form a tight joint between the pot and cover, air induction means leading through the cover, and a combustion flue extending upwardly from said aperture in the cover.

6. In a device of the character described, an inverted frusto-conical pot having a continuous annular offset near its upper edge forming a downwardly facing horizontal shoulder and an upwardly facing conical surface, and a cylindrical surface above the conical surface, the exterior diameter of the pot at said shoulder being less than the internal diameter at the upper end of the pot so that when a plurality of said pots are nested the shoulder of one will rest on the upper edge of the one adjacent below and thus support the upper one in the lower one, and a cover for the pot having a downwardly flanged continuous edge fitting loosely over the said upper cylindrical portion of the pot and engaging the said conical surface to form a tight joint between cover and pot.

7. In a device of the character described, an inverted frusto-conical pot having a continuous annular offset near its upper edge forming a downwardly facing horizontal shoulder and an upwardly facing conical surface, and a cylindrical surface above the conical surface, the exterior diameter of the pot at said shoulder being less than the internal diameter at the upper end of the pot so that when a plurality of said pots are nested the shoulder of one will rest on the upper edge of the one adjacent below and thus support the upper one in the lower one, a cover for the pot having a downwardly flanged continuous edge fitting loosely over the said upper cylindrical portion of the pot and engaging the said conical surface to form a tight joint between cover and pot, said cover having an annular groove in its upper surface near its periphery, and a plurality of spring clamps adapted to engage in said groove and under said downwardly facing shoulder to hold the cover on the pot.

8. In an orchard heater, the combination of an oil containing receptacle of frusto-conical form, being larger at the top than at the bottom, said receptacle having an outwardly extending annular ledge adjacent to its top adapted to provide a grip for handling the receptacle, a cover snugly fitting the receptacle above said flange, a combustion stack on the cover, an air inlet means to the receptacle to one side of the stack, and clamping means co-acting with the cover and said flange to maintain an airtight joint between the cover and the receptacle.

In witness that I claim the foregoing I have hereunto subscribed my name this 19th day of June 1913.

EMANUEL W. DUNN.

Witnesses:
JAMES T. BARKELEW,
ELWOOD H. BARKELEW.